US005673121A

United States Patent [19]
Wang

[11] Patent Number: 5,673,121
[45] Date of Patent: Sep. 30, 1997

[54] STOCHASTIC HALFTONING SCREENING METHOD

[75] Inventor: Shen-ge Wang, Fairport, N.Y.

[73] Assignee: Xerox Corporation, Stamford, Conn.

[21] Appl. No.: 663,419

[22] Filed: Jun. 17, 1996

[51] Int. Cl.⁶ .................................................. G03B 21/60
[52] U.S. Cl. ............................................. 358/456; 358/457
[58] Field of Search ............................... 358/534–536, 358/429–430, 456–460; 399/180–182; 395/102, 109

[56] References Cited

U.S. PATENT DOCUMENTS

| | | | |
|---|---|---|---|
| 4,149,194 | 4/1979 | Holladay | 358/283 |
| 4,485,397 | 11/1984 | Scheuter et al. | 358/283 |
| 4,595,948 | 6/1986 | Itoh et al. | 358/75 |
| 4,876,611 | 10/1989 | Fischer et al. | 358/456 |
| 5,014,123 | 5/1991 | Imoto | 358/75 |
| 5,111,194 | 5/1992 | Oneda | 340/793 |
| 5,341,228 | 8/1994 | Parker et al. | 358/534 |
| 5,394,252 | 2/1995 | Holladay et al. | 358/533 |
| 5,438,431 | 8/1995 | Ostromoukhov | 358/457 |
| 5,489,991 | 2/1996 | McMurray | 358/456 |
| 5,579,445 | 11/1996 | Loce et al. | 395/102 |
| 5,586,203 | 12/1996 | Spaulding et al. | 382/270 |

OTHER PUBLICATIONS

Eschbach et al. "Binarization using a Two–Dimensional Pulse–Density Modulation"; J. Opt. Soc. Am. A; vol. 4, No. 10, Oct. 1987, pp. 1873–1878.

Eschbach; "Pulse–Density Modulator on Rastered Media: Combining Pulse–Density Modulation and Error Diffusion"; J. Opt. Soc. Am. A/vol. 7, No. 4, Apr. 1990, pp. 708–716.

Primary Examiner—Edward L. Coles, Sr.
Assistant Examiner—Stephen Brinich
Attorney, Agent, or Firm—Mark Costello

[57] ABSTRACT

An idealized stochastic screen is characterized by all of the predominant color dots (black or white) uniformly distributed. The present invention seeks to approach this optimization by iteratively selecting pairs of threshold levels in the screen matrix, and measuring the approach to the idealized stochastic screen. The threshold values are then swapped in position to determine whether the swap improves the measurement or not. If it does, the swap is maintained. The process is iterated until the desired result is obtained.

7 Claims, 5 Drawing Sheets

STOCHASTIC HALFTONING SCREENING METHOD

The present invention is directed to a method and apparatus for halftoning gray images represented at a number of levels higher than can be reproduced by an output device.

BACKGROUND OF THE INVENTION

Color in documents is the result of a combination of a limited set of colors over a small area, in densities selected to integrate to a desired color response. This is accomplished in many printing devices by reproducing separations of the image, where each separation provides varying density of a single primary color. When combined together with other separations, the result is a full color image.

In the digital reproduction of documents, a separation is conveniently represented as a monochromatic bitmap, which may be described as an electronic image with discrete signals (hereinafter, pixels) defined by position and density. In such a system, density is described as one level in a number of possible states or levels. When more than two levels of density are used in the description of the image, the levels are often termed "gray", indicating that they vary between a maximum and minimum, and without reference to their actual color. Most printing systems have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. It is required that an image initially described at a large set of levels also be describable at a smaller set of levels, in a manner which captures the intent of the user. In digital reproduction of color documents this means that each of the color separations is reduced from the input number of levels to a smaller output number of levels. The multiple color separations are combined together at printing to yield the final color print. Commonly, color documents are formed using cyan, magenta and yellow colorants or cyan, magenta, yellow and black colorants. A larger number or alternative colorants may also be used.

Printers typically provide a limited number of output possibilities, and are commonly binary, i.e., they produce either a spot or no spot at a given location (although multilevel printers beyond binary are known). Thus, given an image or a separation in a color image having perhaps 256 possible density levels, a set of binary printer signals must be produced representing the contone effect. In such arrangements, over a given area in the separation having a number of contone pixels therein, each pixel value in an array of contone pixels within the area is compared to one of a set of preselected thresholds as taught, for example, in U.S. Pat. No. 4,149,194 to Holladay. The effect of such an arrangement is that, for an area where the image is a contone, some of the thresholds will be exceeded, i.e. the image value at that specific location is larger than the value of the threshold for that same location, while others are not. In the binary case, the pixels or cell elements for which the thresholds are exceeded might be printed as black or some color, while the remaining elements are allowed to remain white or uncolored, dependent on the actual physical quantity described by the data. The described halftoning or dithering method produces an output pattern that is periodic or quasiperiodic in the spatial coordinates.

Dithering creates problems in color document reproduction where the repeating pattern of a screen through the image, when superposed over similar repeating patterns in multiple separations, can cause moiré or other artifacts, particularly in printing systems with less than ideal registration between separations.

One of the advantages of stochastic, or non-periodic screening over periodic screening is the suppression of moiré. In this respect, note also, U.S. Pat. No. 5,394,252 to Holladay et al.

In U.S. Pat. No. 5,341,228 to Parker et al., a halftoning system using a stochastic process known as a blue noise mask is described. Briefly, the procedure can be described as follows: 1) Starting at one gray level with a chosen dot pattern, or "seed", the process iteratively uses a Fast Fourier Transform (FFT) techniques with a "blue noise" filter to redistribute all spots in dot pattern and eliminate large visual "clumps", 2) Next, the dot pattern is processed at the next gray level by increasing (or decreasing) certain number of black spots on the previously determined dot pattern. Existing black (or white) spots are not moved. The same filtering technique is used to distribute newly added (or subtracted) dots; 3) Step 2 is then repeated for all gray levels sequentially. At each step, the width of the blue-noise filter varies by an amount corresponding to the current gray level; 4). The summation of dot patterns for each gray levels is the blue noise mask generated. The mask is then used to generate a halftone screen. The result of described sequential design procedure strongly depends on the choice of the seed pattern. If the output is not a satisfactory one, the design procedure has to start over again by choosing different seed or changing the blue noise filter. Since the threshold value of each pixel of the dithering screen is fixed at the gray level when the corresponding dot is added (or eliminated), the freedom to locate undetermined pixels is getting smaller and smaller while the design sequence is approaching the end. These constraints limit further improvement of the image quality generated by blue noise masks.

U.S. Pat. No. 4,485,397 to Scheuter et al. describes a method for generating a non-periodic halftone distribution by determining areas of constant or nearly constant input density and by distributing a precalculated number of print dots inside each area based on a random or pseudo random number and some spatial constraints.

U.S. Pat. No. 4,876,611 to Fischer et al. describes another stochastic screening algorithm in which the print/no-print decision is based on a recursive subdivision of the print field maintaining average density over the larger print field.

A non-periodic halftoning scheme based on a pulse-density modulation is taught in "Binarization using a two-dimensional pulse-density modulation", by R. Eschbach and R. Hauck, Journal of the Optical Society of America A, 4, 1873–1878 (1987) and "Pulse-density modulation on rastered media: combining pulse-density modulation and error diffusion", by R. Eschbach, Journal of the Optical Society of America A, 7, 708–716 (1990). In pulse-density modulation a mathematical model is used that guarantees the local density of print pulses as a function of the input image data.

The above references are herein incorporated by reference for their teachings.

SUMMARY OF THE INVENTION

The present invention is directed to a method of designing a halftone screen which is based on a function designed to approach an idealized stochastic screen.

In accordance with another aspect of the invention, an idealized stochastic screen is characterized by all of the predominant color dots (black or white) uniformly distributed. The present invention seeks to approach this optimization by iteratively selecting pairs of threshold levels in the screen matrix, and measuring the approach to the idealized stochastic screen. The threshold values are then swapped in position to determine whether the swap improves the measurement or not. If it does, the swap is maintained. The process is repeated a predetermined number of times.

In accordance with another aspect of the invention there is provided a method of designing a halftone cell, for converting an images received at d levels, for reproduction at 2 levels, the method including the steps:

a. initially assigning a set of threshold signals varying across a range of gray levels to locations in a screen matrix, each threshold signal defined by value and position in the matrix;

b. selecting at least two threshold signals in the screen matrix;

c. characterizing the uniformity of distribution of spots through the halftone screen cell;

d. swapping the two threshold signal positions in the screen matrix;

e. recharacterizing the uniformity of distribution of spots through the halftone screen cell;

f. as a function of the recharacterization, either maintaining the threshold signals in the swapped positions of the halftone screen or otherwise returning the threshold values to the initial positions;

g. iteratively repeating a preselected number of iterations, steps b through f.

In accordance with still another aspect of the invention, characterization may be a measurement.

The proposed stochastic screen design uses a merit function counting the visual appearance of all gray levels. The same merit function is used throughout the entire optimization process. Also, the new method can apply any existing dithering screen as the start point for further improvement. We believe that this invention promises a better overall quality of dithered halftone images than the conventional design methods.

These and other aspects of the invention will become apparent from the following descriptions used to illustrate a preferred embodiment of the invention, read in conjunction with the accompanying drawings in which:

Figure 1:
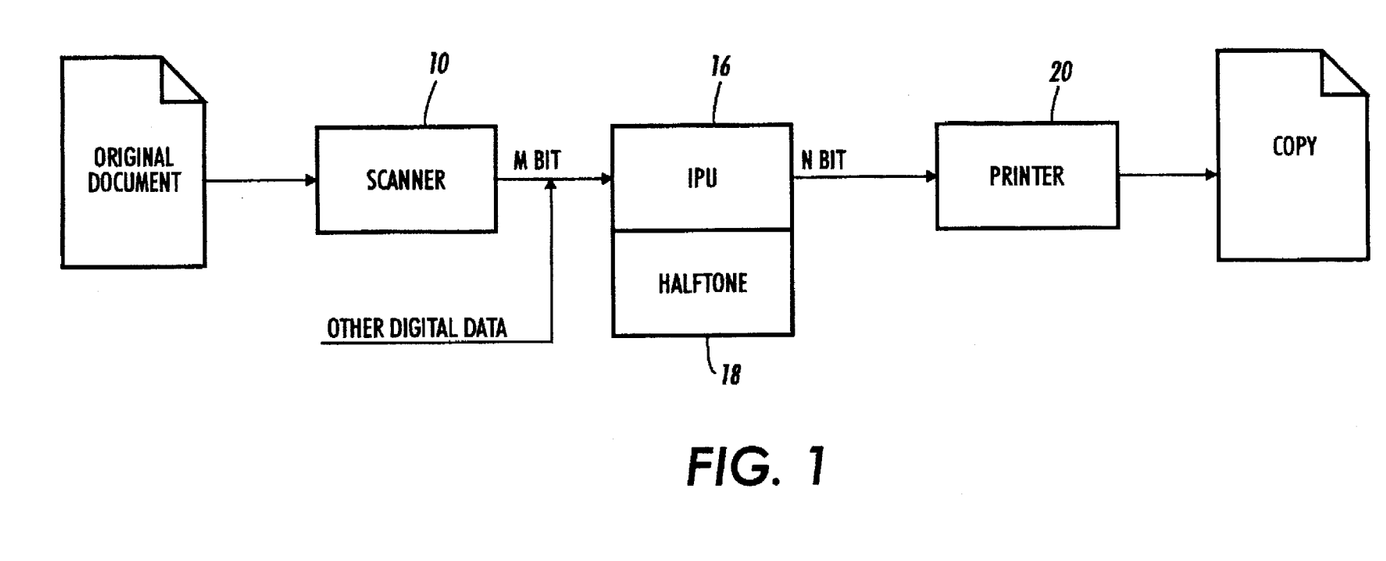
FIGS. 1 and 2 represent a halftoning system in which the present invention finds use.

Referring now to the drawings where the showings are for the purpose of describing an embodiment of the invention and not for limiting same, a basic image processing system is shown in FIG. 1. In the present case, gray image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, the term "dot pattern" refers to a product or an image resulting from a screening process. A "screen cell", as used herein, refers to the set of pixels which together will form the dot pattern, while the term "screen matrix" will be used to describe the set of values which together make up the set of threshold to be applied. A "pixel" refers to an image signal associated with a particular position in an image, having a density between white and black. Accordingly, pixels are defined by intensity and position. A dot pattern is made up of a plurality of pixels. These terms are used for simplification and it should be understood that the appropriate sizing operations have to be performed for images where the input resolution in terms of scan pixels is different from the output resolution in terms of print pixels.

In a typical color system, color documents are represented by multiple sets of image signals, each set (or separation) represented by an independent channel, which is usually processed more or less independently. A "color image" as used herein is therefore a document including at least two separations, such as in the Xerox 4850 Highlight Color Printer and commonly three or four separations, such as in the Xerox 4700 Color Laser Printer, Xerox 5775 Digital Color Copier, or the Xerox 4900 printer, or sometimes more than four separations (a process sometimes called hi-fi color). One possible digital copier (a scanner/printer combination) is described for example, in U.S. Pat. No. 5,014,123, incorporated herein by reference. Each separation provides a set of image signals which will drive a printer to produce one color of the image. In the case of multicolor printers, the separations superposed together form the color image. In this context, we will describe pixels as discrete image signals, which represent optical density of the document image in a given small area thereof. The term "pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used.

With reference now to FIG. 1, which shows a general system requirement representing the goal of the invention, an electronic representation of an original document (hereinafter, an image) from image input terminal such as scanner 10 derives electronic digital data in some manner, in a format related to the physical characteristics of the device, and commonly with pixels defined at m bits per pixel. Common color scanners, such, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone processor 18 which converts m bit digital image signals to n bit digital image signals, suitable for driving a particular printer, where m and n are integer values. It also well within the contemplation of the present invention, to derive images electronically. In such cases, the images may be represented by a page description language file, describing the appearance of the page. In such a case, the IPU might include processing element for decomposition of the page, and color conversions elements for providing appropriate signals for driving a printer.

Figure 2:
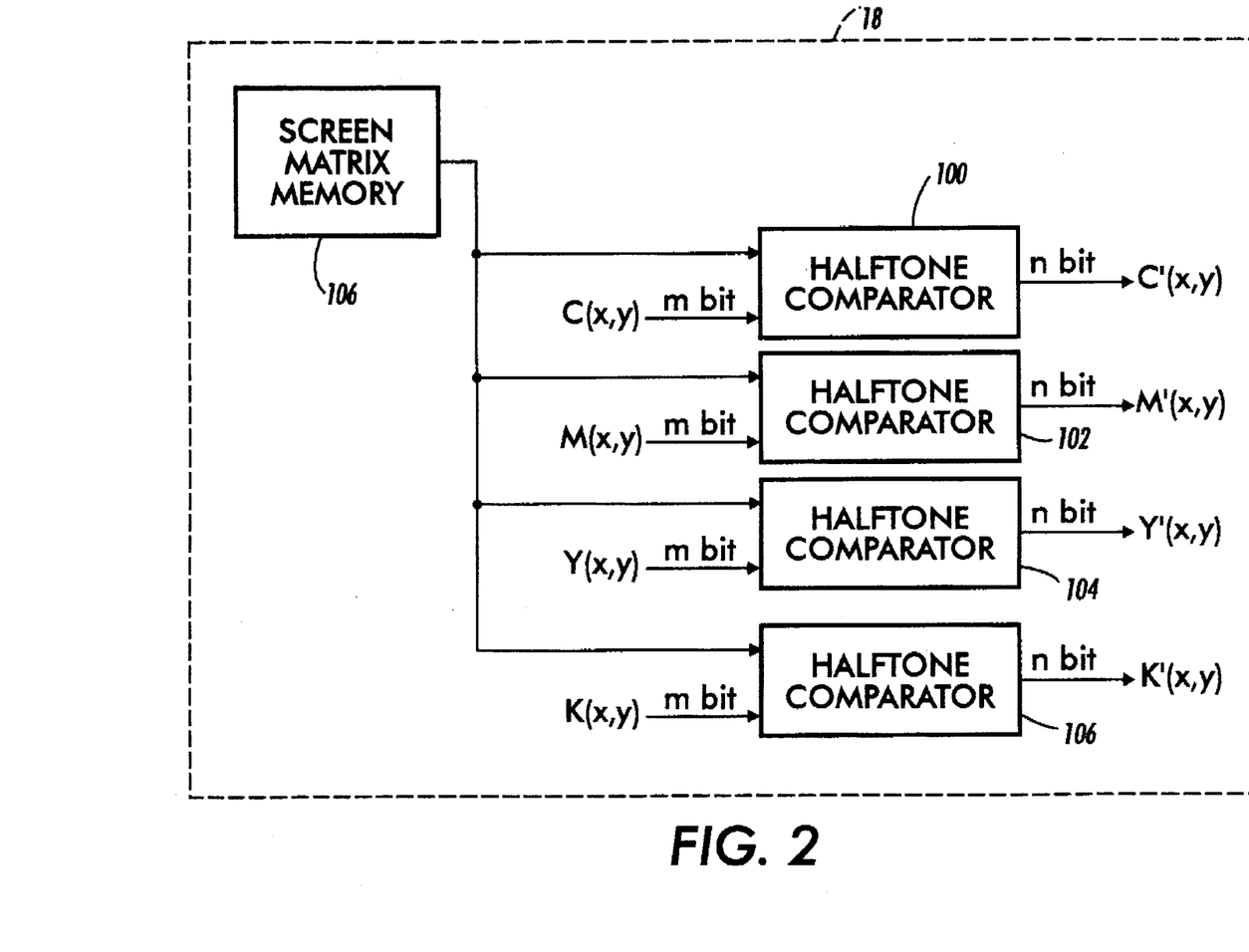

FIG. 2 shows the halftone processor 18 operational characteristics. In this example, there is illustrated a color processing system, using four separations, C(x, y), M(x,y), Y(x, y), K(x, y), obtained and each processed independently for halftoning purposes to reduce an m-bit input to an n-bit output. It will be appreciated that the invention is also applicable to the "single separation" or black and white reproduction situation as well. Accordingly, we show a source of screen matrix information, screen matrix memory 106, which provides one input to each comparator 100, 102, 104, 106 and 108 for each separation, where the other comparator is the m bit separation bitmap. The output is m bit output, which can be directed to a printer. This illustration is highly simplified, in that distinct screen matrices may be supplied to each comparator.

Now, the principle of the present invention will be discussed. Consider generating halftone images from constant gray-scale inputs by a screen matrix with N elements. If the overlap between adjacent pixels is ignored, the screen cell with n black pixels and N−n white pixels simulates the input with a gray scale (g) equal to g=(N−n)/N, where 0<n<N, or 0<g<1. The visual appearance of this pattern depends on whether the black pixels or the white pixels are minorities. If the black pixels are, i.e., 0.5<g<1.0, the best visual appearance of the halftone pattern occurs when all black pixels are "evenly" distributed, in other words, each black pixel should "occupy" 1/n, or 1/(1−g)N, fraction of the total area of the screen. Therefore, the average distance of adjacent black pixels should be equal to $\alpha(1-g)^{-1/2}$, where $\alpha$ is independent of gray levels. On the other hand, if the white pixels are minorities, i.e., 0<g<0.5, each white pixel should "occupy" 1/(N−m) or 1/gN, fraction of the total area and the average distance of adjacent white pixels should be equal to $\alpha g^{-1/2}$. An idealized stochastic dithering screen is defined as a threshold mask generating halftone images which satisfy above criterion for all gray levels.

For the following discussion, the input gray-scale images are specified by integer numbers, G(x, y), where 0<G<M. Under this assumption the dithering screen should have M different threshold values spanning from zero to M−1. We further assume that at each level there are (N/M) elements having the same threshold value T. The ultimate goal of designing a stochastic screen is to distribute the threshold values T so that the resulting halftone images are as close as possible to the ones generated by an idealized stochastic screen. Here, it is demonstrated that it is possible to create "good quality" stochastic screens using above criterion and optimization techniques.

Choosing an arbitrary pair of pixels from the dithering screen, we assume that the threshold values for these two pixels are $T_1=T(x_1, y_1)$ and $T_2=T(x_2, y_2)$, respectively, where $(x_1, y_1)$ and $(x_2, y_2)$ are the coordinates of these pixels. As the result of dithering a constant input G, the outputs $B_1=B(x_1, y_1)$ and $B_2=B_2(x_2, y_2)$ have the following possible combinations:

1. $B_1=1$ and $B_2=1$, if $G>T_1$ and $G>T_2$;
2. $B_1=0$ and $B_2=0$, if $G<T_1$ and $G<T_2$;
3. $B_1 \neq B_2$, where B=1 represents a white spot and B=0, a black spot for printing Under case 3, where one output pixel is black and another is white, their distance is irrelevant to the visual appearance according to the criterion discussed above. For case 1, we can further consider the difference between the two situations:

1a. if M/2>G, $G>T_1$, $G>T_2$;
1b. elsewhere.

Under case 1a, both output pixels are white, and white spots are minorities. Therefore, the corresponding distance between $(x_1, y_1)$ and $(x_2, y_2)$ is relevant to the visual appearance of the halftone images. According to our analysis above this distance is greater or equal to $\alpha g^{-1/2}$, or $\alpha(G/M)^{-1/2}$, for outputs of an idealized stochastic screen. Among all G under case 1a, the critical case of G is the smallest one, or $G_c=\text{Max}(T_1, T_2)$, which requires the largest distance between the two pixels $(x_1, y_1)$ and $(x_2, y_2)$.

Similarly, when both dots appear as black dots, the visual appearance under the following cases must be considered:

2a. if G<M/2; $G>T_1$ and $G>T_2$
2b. elsewhere.

Among all G under case 2a, the largest G is given by $G_c=\text{Min}(T_1, T_2)$, which requires the largest distance $\alpha(1-G_c/M)^{-1/2}$ between $(x_1, y_1)$ and $(x_2, y_2)$.

Mathematically, we can use a merit function $q(T_1, T_2)$ to evaluate the difference between the idealized stochastic screen and the chosen one. For example, we used the following choice for the experiment described later:

$$q(T_1, T_2)=\exp(-C \cdot d^2/d_c^2), \quad (1)$$

where
$d^2=(x_1-x_2)^2+(y_1-y_2)^2$;
$d_c^2=M/[M-\text{Min}(T_1, T_2)]$, if $T_2>M/2$ and $T_1>M/2$,
$d_c^2=M/\text{Max}(T_1, T_2)$, if $T_2<M/2$, and $T_1<M/2$,
$d_c^2=0$, i.e., q=0, elsewhere;
and C is a constant.

Since a dithering screen is used repeatedly for halftoning images larger than the screen, for any chosen pair of pixels from the dithering screen the closest spatial distance in corresponding halftone images depends on the dithering method and should be used for the merit function. The overall merit function should include contributions of all possible combinations. In an experiment the summation of $q(T_1, T_2)$ was for optimization, i.e., $$Q=\Sigma q(T_1, T_2), \text{ where } \Sigma \text{ for all } (x_1, y_1) \neq (x_2, y_2) \quad (2)$$

Now, the design of stochastic screens becomes a typical optimization problem. When the threshold values of a chosen screen are rearranged, the merit function can be evaluated to determine the directions and steps. Many existing optimization techniques can be applied to this approach. The simplest method is to randomly choose a pair of pixels and swap threshold values to see if the overall merit function Q is reduced, Since only those q values related to the swapped pair need to be recalculated, the evaluation of Q does not consume significant computation time.

In an example, using the proposed design procedure to produce a screen matrix with 128×64 elements and 256 gray levels was produced. All initial threshold values were randomly chosen by a standard random number generator. Alternatively, the threshold assignments from an existing screen may be used. Besides the Gaussian function described by Eq. (1) as the merit function other functions were tested, such as the Butterworth function and its Fourier transform. Other optimization functions are possible. For this example, Equations (1) and (2) were used as the merit function of optimization. Since this mask is a 45° rotated screen, the 128×64 pattern is repeated with a lateral shift equal to 64. To calculate the overall merit function we considered all pairs of pixels including those with the shift. A Sun Sparc 10 workstation was used for this design test.

Figure 3:
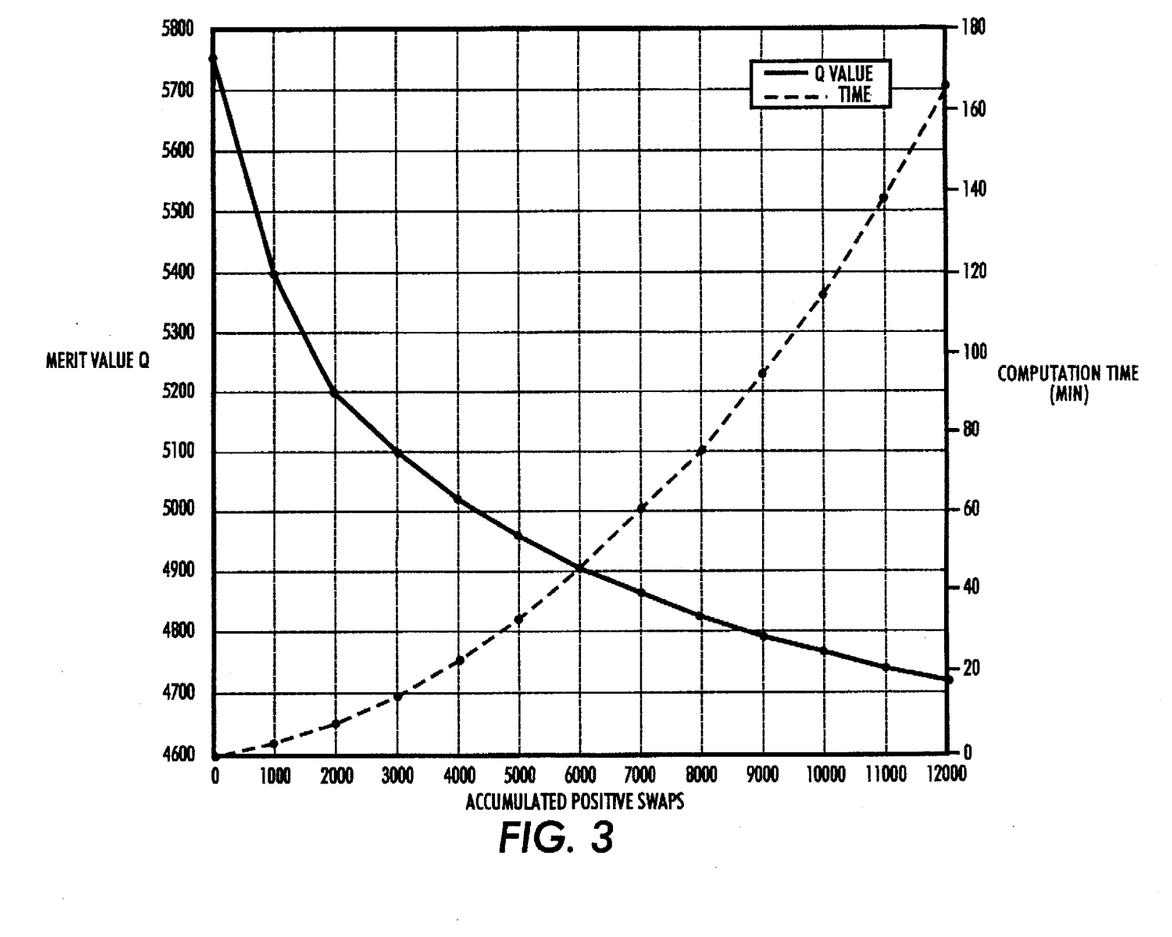
FIG. 3 illustrates the improvement of quality Q over the iterative process of the invention.

For each iteration we randomly chose a pair of pixels from the dithering screen, swapped their threshold values and calculated the change of the merit function Q. If Q was not reduced, we restored the threshold values, otherwise, we proceeded to the next iteration. In FIG. 3, the merit value Q against the number of accumulated "positive" swaps is shown by the solid lines, while the accumulated computation time in seconds is shown by the dash lines. Increasing the number of swaps tends to improve imaging results from the screens, as the screen matrix becomes more idealized.

It is possible that, depending on the obtained value of the merit function, in some percentage of iterations, the changed threshold values are kept even though they do not improve the merit function Q, a process known as simulated annealing.

Figure 4:
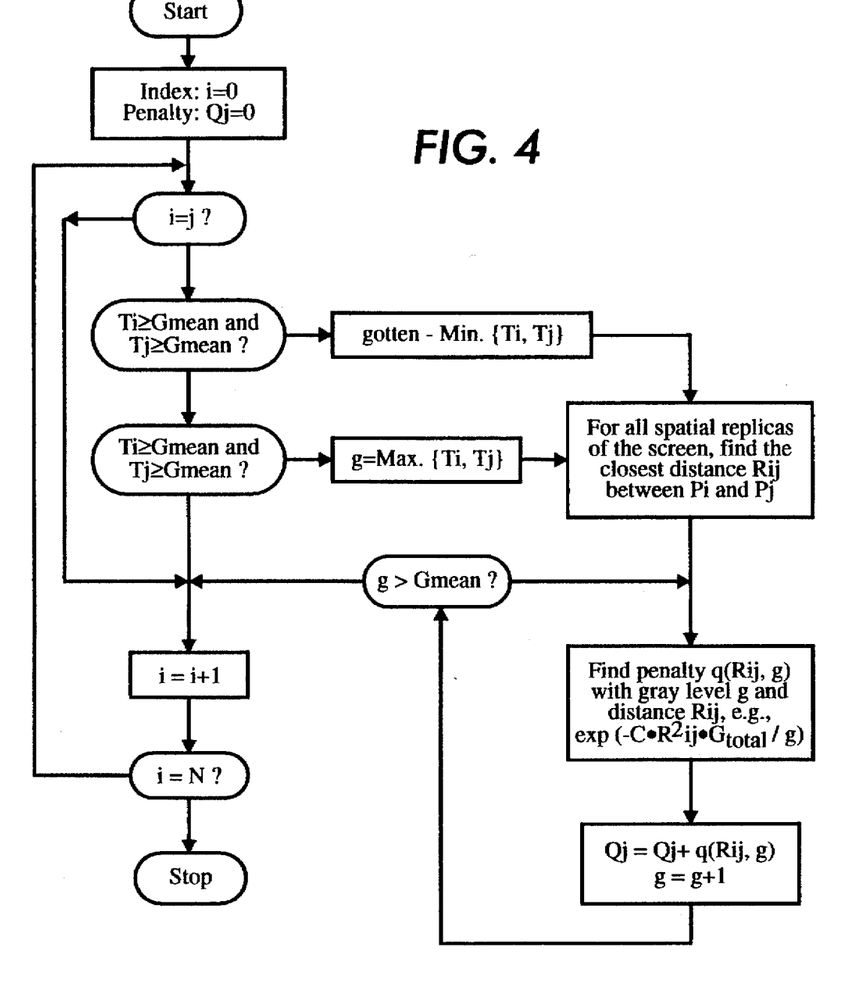
FIG. 4 illustrates a flow chart of process for finding the local quality measurement.

Turning now to FIG. 4 and an implementation of the invention, the invention is readily implemented in a general purpose computer, programmed to generate the screen matrix values. Once obtained, the screen matrix values may be readily entered and stored into a halftoning device memory, such as that shown in FIG. 2.

One possible embodiment of the invention might take the form of a computer programmed in accordance with the following method, shown in FIG. 4. For a given pixel $P_j$, located at $x_j$, $y_j$ and with threshold value $T_j$, we find its contribution $Q_j$ to the total penalty function $Q_{total}$. All pixels of the given threshold screen with N elements are indexed from 0 to N−1. Each pixel $P_i$ is associated with its index i, the spatial location $x_i$, $y_i$ and the threshold value $T_i$. The mean of the gray scale is $G_{mean}$ and the full range of gray scale is $G_{total}$.

At step 400, index values, including i and $Q_j$ are set to 0. Value i refers to the index to all pixels other than $P_j$, while $Q_j$ refers to the total contribution by all pairs of $P_j$ and $P_i$. Step 402 checks a counter keeping the calculations when i=j. Step 404 provides a test wherein each threshold value in the system is compared to the mean gray value for the system, Gmean. If the threshold values are both greater than $G_{mean}$, g is set to $G_{total}$−Min$\{t_i, T_j\}$ at step 406. It the threshold values are both less than $G_{mean}$, g is set to Max$\{t_i, t_j\}$. In such case, at step 410, for all the spatial replicas of the screen, we calculate the closest distance Rij between Pi and $P_j$. At step 412, using the distance $R_{ij}$, we calculate the penalty value q($R_{ij}$, g) with gray level g and distance $R_{ij}$, e.g., exp(−C●$R^2$ij●$G_{total}$/g). Steps 414 and 416 form an iterative loop with step 412, iteratively calculating $Q_j$=$Q_j$+ q($R_{ij}$, g) and g=g+1 and determining whether g>$G_{mean}$. If it is not, the penalty value q($R_{ij}$, g) at the next gray level is recalculated and added to the total contribution $Q_j$. If g>$G_{mean}$, the value of i is incremented and checked for completion of the iterative process at step 418 and the process is either ended or iterated for the next pixel.

Figure 5:
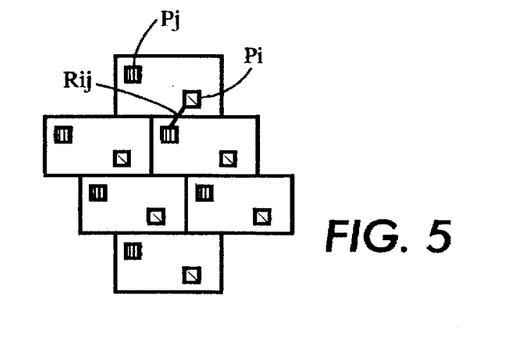
FIG. 5 illustrates the measurement of Rij.

FIG. 5 illustrates the measurement of $R_{ij}$.

Figure 6:
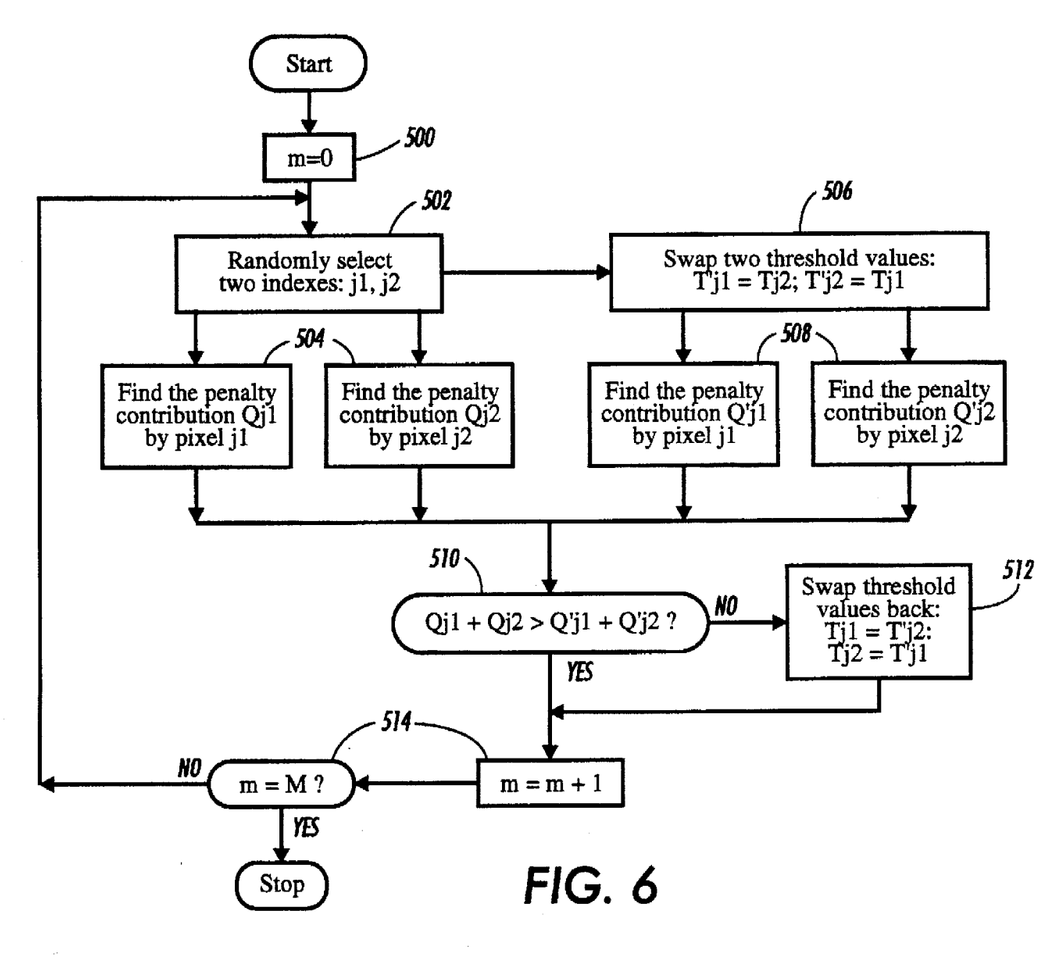
FIG. 6 illustrates the global quality measurement used to derive an optimized threshold screen.

FIG. 6, shows a flow chart of a process that optimizes the operation for M iterations. At step 500, m is set equal to 0. At step 502, $j_1$ and $j_2$ are randomly selected. Based on these values, two processes occur, 504) penalty contributions $Q_{j1}$ and $Q_{j2}$ are calculated for pixel $j_1$ and $j_2$ respectively, and 506) two corresponding threshold values are swapped so that T'$_{j1}$ is set equal to $T_{j2}$ and T'$_{j2}$ is set equal to $T_{j1}$. At step 508, from the new values of T'$_{j1}$ and T'$_{j2}$, we calculate the penalty contribution Q'$_{j1}$ by pixel $j_1$, and the penalty contribution Q'$_{j2}$, by pixel $j_2$, respectively.

At step 510 from the calculated penalty values $Q_{j1}$, $Q_{j2}$, Q'$_{j1}$ and Q'$_{j2}$, we determine whether $Q_{j1}$+$Q_{j1}$>Q'$_{j1}$+Q'$_{j2}$. If not, at step 512, we reset T'$_{j1}$ and T'$_{j2}$ to their original values. Otherwise, we maintain the new threshold values, and at step 514 we increment m for another iteration and determine whether we have reached a final iteration.

Typically speaking, threshold screens will be calculated and stored for later distribution as matrices of threshold values. Upon later distribution, these matrices can be downloaded in an appropriate manner into device memories for use as required.

The resulting threshold screens may be used for the generation of gray in monochromatic images. They may also be used for the generation of color separations in polychromatic or other multiple separation images. In polychromatic or color images, these stochastic screens may be used exclusively, or in combination with other stochastic or nonstochastic screens, as taught, for example, by U.S. Pat. No. 5,394,252 to Holladay et al.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A method of designing a halftone cell, for converting an image received at d levels, for reproduction at 2 levels, the method including the steps:

a. initially assigning a set of threshold signals varying across a range of gray levels to locations in a screen matrix, each threshold signal defined by value and position in the matrix;

b. selecting at least two threshold signals in said screen matrix;

c. for a selected halftone level, characterizing the uniformity of distribution of spots through the halftone screen cell;

d. swapping the two threshold signal positions in the screen matrix;

e. recharacterizing the uniformity of distribution of spots through the halftone screen cell;

f. as a function of the recharacterization, selecting one of maintaining the threshold signals in the swapped positions on the halftone screen and otherwise returning the threshold values to the initial positions;

g. iteratively repeating a preselected number of iterations, steps b through f.

2. The method as defined in claim 1, wherein the initial assignment of the set of threshold signals is random.

3. The method as defined in claim 1, wherein uniformity is characterized by a function Q for each said of at least two thresholds $T_1$ at position $x_1, y_1$ in the screen and $T_2$ at position $x_2, y_2$ in the screen, where a local measurement includes:

$$q(T_1, T_2) = \exp(-C \cdot d^2/d_c^2)$$

where p1 $d^2 = (x_1-x_2)^2 + (y_1-y_2)^2$;

$d_c^2 = M/[M-\text{Min}(T_1, T_2)]$, if $T_2 > M/2$ and $T_1 > M/2$, $d_c^2 = M/\text{Max}(T_1, T_2)$, if $T_2 < M/2$ and $T_1 < M/2$, $d_c^2 = 0$, i.e., $q = 0$, elsewhere;

C is a constant; and

M is a number of threshold levels in the screen and Q is given by $Q = \Sigma q(T_1, T_2)$.

4. The method as defined in claim 1, wherein said predetermined number of iterations is greater than 5000 swaps.

5. The method as defined in claim 1, wherein uniformity is characterized by a function Q based on a Gaussian function.

6. The method as defined in claim 1, wherein uniformity is characterized by a function Q based on a Butterworth function.

7. The method as defined in claim 1, where uniformity is characterized by a function Q based on a Fourier Transform of a Butterworth function.

* * * * *